Oct. 10, 1933.    W. A. SPEAR    1,930,289
SYNCHRONOUS MOTOR CLOCK
Filed Nov. 24, 1930    2 Sheets-Sheet 1
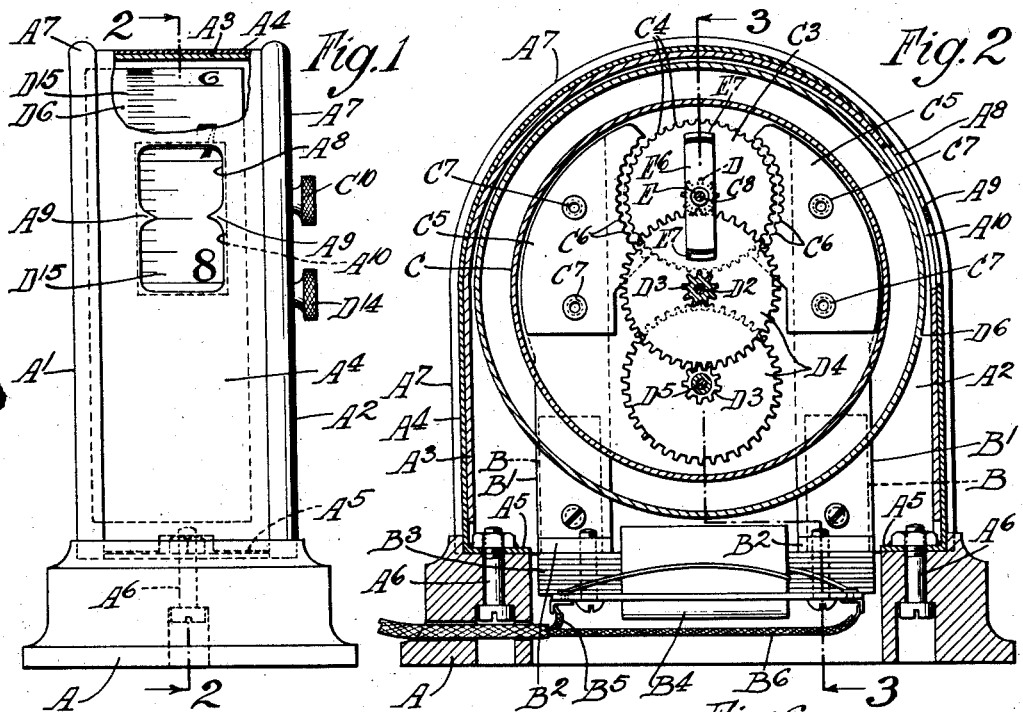
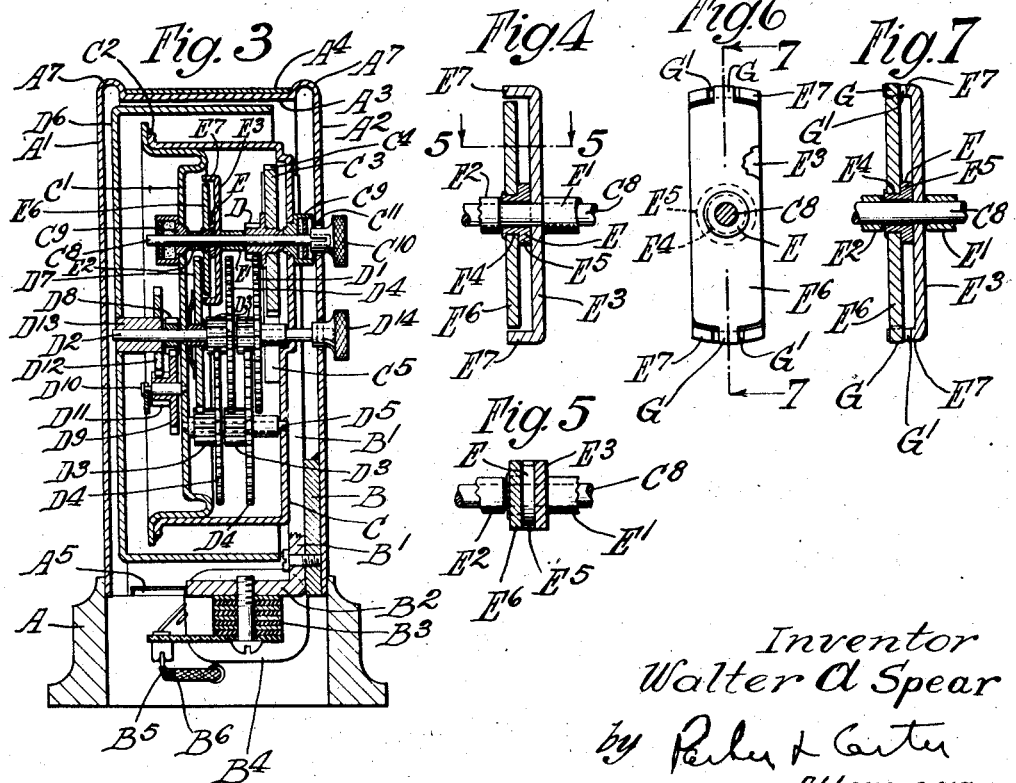
Inventor
Walter A Spear
by Parker & Carter
Attorneys.

Oct. 10, 1933.   W. A. SPEAR   1,930,289
SYNCHRONOUS MOTOR CLOCK
Filed Nov. 24, 1930   2 Sheets-Sheet 2
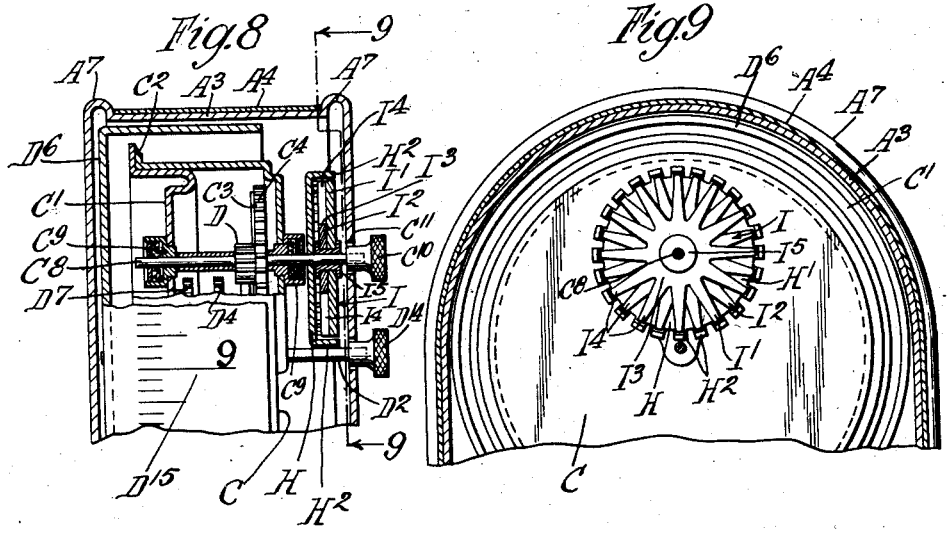
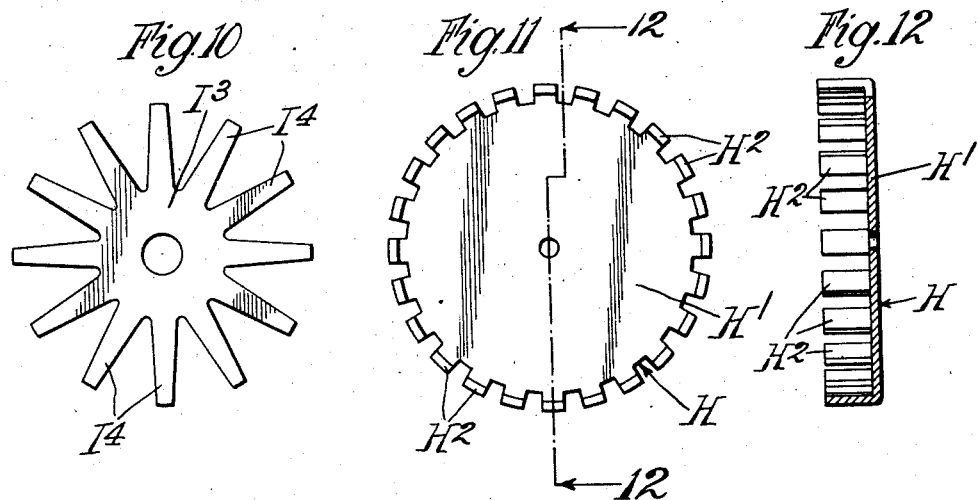
Inventor
Walter A Spear
by Parker Carter
Attorneys.

Patented Oct. 10, 1933

1,930,289

UNITED STATES PATENT OFFICE 1,930,289

SYNCHRONOUS MOTOR CLOCK

Walter A. Spear, Cincinnati, Ohio, assignor, by mesne assignments, to Victor Electric Products, Inc., Cincinnati, Ohio, a corporation of Ohio Application November 24, 1930
Serial No. 497,646

1 Claim. (Cl. 172—275)

My invention relates to a synchronous motor or alternating current clock, and to a motor therefor, and has for one object the provision of a clock which may be operated by a synchronous motor in circuit with a commercial source or supply of alternating current. One object of my invention is the provision of such a clock which shall be efficient and regular. Another object is the provision of improved means for rendering such a clock readily started manually. Another object is the provision of means for preventing hunting. Other objects will appear from time to time in the course of the specification and claim.

I illustrate my invention more or less diagrammatically in the accompanying drawings, wherein—

Figure 1 is an elevation;
Figure 2 is a section on the line 2—2 of Figure 1;
Figure 3 is a section on the line 3—3 of Figure 2;
Figure 4 is a detail;
Figure 5 is a section on the line 5—5 of Figure 4;
Figure 6 is a detail of a variant form;
Figure 7 is a section on the line 7—7 of Figure 6;
Figure 8 is a partial section through a variant form;
Figure 9 is a section on the line 9—9 of Figure 8;
Figure 10 is a detail;
Figure 11 is a detail; and
Figure 12 is a section on the line 12—12 of Figure 11.

Like parts are indicated by like symbols throughout specification and drawings.

Referring to the drawings, A generally indicates a clock base, on which may be mounted a housing structure which includes side panels $A^1$ $A^2$, connected by an arcuate intermediate wall. Overlying said wall is a front and rear panel or strip $A^4$, having inturned ends $A^5$ which may be secured to the base, as by the bolts $A^6$. It will be understood that the surrounding strip $A^4$ clamps the housing structure which includes the panels $A^1$ $A^2$ and arcuate wall $A^3$ upon the base A. I illustrate the edges of the panels $A^1$ $A^2$ as rolled over as at $A^7$ which project beyond the edges of the strip $A^4$, $A^8$ is an indicating aperture in one side of the panel $A^4$, the edges of which are formed as indicating fingers, as at $A^9$. An aperture $A^{10}$ in the wall $A^3$ is in register with the aperture $A^8$.

Positioned on the inner face of the panel $A^2$ are a plurality of relatively thick plates B, to which may be secured combined pole pieces and clock supports $B^1$, the pole pieces being provided with angles or outwardly projecting offsets $B^2$ at their lower ends, connected by the laminated member $B^3$, about which is the coil $B^4$ in circuit as by conductive lines $B^5$ $B^6$ with any suitable source of alternating current.

Secured to the upper ends of the pole pieces $B^1$ is an oil-tight housing, including the housing or cup member C and a lid or front $C^1$ therefor, the edges of the members C and $C^1$ being secured together, for example soldered, as at $C^2$. Positioned within the housing C is the rotor $C^3$ being indicated as having a plurality of teeth $C^4$ opposed to teeth $C^6$ on the pole pieces $C^5$ secured to and in effect forming part of the pole pieces $B^1$. The inner pole pieces $C^5$ are positioned inside of the housing C, which are connected to the exterior pole pieces, for example by bolts or rivets $C^7$. The relation of the inner pole pieces $C^5$ and the rotor $C^3$ will be clear from Figure 2. The rotor $C^3$ is mounted on a shaft $C^8$ rotating in suitable bearings $C^9$ and terminating, exteriorally of the housing C, in a knurled knob $C^{10}$. This knob is positioned exteriorally of the panel $A^2$, the panel being apertured as at $C^{11}$ to permit its passage therethrough.

D is a pinion on the rod $C^8$ in mesh with a gear $D^1$ on the shaft $D^2$. The details of the clock mechanism or train of gears herein shown do not of themselves form part of the present invention, but it will be understood that through the train of gears, including the pinion D, the gear $D^1$ and other pinions $D^3$ and gears $D^4$ on the shafts $D^2$ and $D^5$ respectively, rotation of the rotor $C^3$ and the shaft $C^8$ effects rotation of the drum $D^6$. The gears $D^4$ and associated pinions $D^3$ are loosely mounted upon the shafts $D^2$ $D^5$. In mesh with one of the pinions $D^3$ upon the shaft $D^5$ is the gear $D^7$ fixed in relation with the shaft $D^2$. Mounted for rotation with the shaft $D^2$ exterior of the housing C is the driving pinion $D^8$ in mesh with the gear $D^9$ upon the stub shaft $D^{10}$. The final driving connection is through the associated pinion $D^{11}$ meshing with the gear $D^{12}$ fixed in relation to the sleeve $D^{13}$ which serves to support and center the drum $D^6$ and fix its axis of rotation. The sleeve $D^{13}$ is mounted upon and free to rotate independently of rotation of the shaft $D^2$. The shaft $D^2$ is also provided with an exterior knob $D^{14}$, whereby a more rapid rotation of the drum may be provided than is obtained through the normal rotation of the rotor $C^3$. This permits the setting of the drum at any desired position, and thus permits setting of the time indicating means, when correction is necessary.

Mounted upon the shaft $C^8$ and rotatable thereabout is the sleeve E which is confined between spacers $E^1$ $E^2$. Interposed between the spacer $E^1$ and the sleeve E is the member $E^3$ fixed upon the shaft $C^8$, for example by a pressed fit. It may be of steel or other material susceptible to attraction by a magnet. Rotatable with the sleeve E about the shaft $C^8$ and spaced from the member $E^3$ as by the shoulder $E^5$, is the permanent magnet $E^6$ which may be of magnetic steel. Opposite the ends of the magnet $E^6$ the member $E^3$ is offset, as at $E^7$ to extend into the plane of the magnet and closely to approach the ends of the magnet.

Referring to the variant form of Figures 6 and 7, the magnet $E^6$ is provided with terminal portions or teeth G which extend forwardly into an aperture $G^1$ in the offset ends $E^7$ of the member $E^3$. As will be seen from Figure 6, the clearance of the members G within the aperture $G^1$ is sufficient to permit a substantial rotation of the magnet $E^6$ in relation to the member $E^3$. In the form of Figures 6 and 7 the member $E^3$ is also a permanent magnet, and normally the teeth G are held in central position in the aperture $G^1$ by the repulsion of like poles of the two magnets.

Referring to the form of Figure 8 and following, I mount the member H, susceptible to attraction by a magnet, the member H including a disc $H^1$ with the teeth $H^2$ upset or offset therefrom. The member H is held against rotation in relation to the shaft $C^8$. Mounted for rotation upon the shaft $C^8$ is a magnetic member generally indicated as I which includes two star members $I^1$ $I^2$. Each such star member includes a hub $I^3$ and a plurality of arms or teeth $I^4$ radially extending therefrom. The parts are so proportioned that when the star members $I^1$ $I^2$ are secured together as a unit, for example by the sleeve $I^5$, the teeth of the two stars alternate, as shown in Figure 9. Each alternate tooth is of different polarity.

It will be realized that whereas I have described and shown a practical and operative device, nevertheless many changes may be made in size, shape, number and distribution of parts. I therefore wish my drawings and description to be taken as in a broad sense illustrative and diagrammatic, rather than as limiting me to the precise features and limitations herein described and shown. In particular I wish it to be understood that the precise details of the synchronous motor herein shown do not of themselves form part of the present invention, and I do not wish my present inertia member to limit it to use with a synchronous motor clock or to use with the particular clock herein shown, except so far as I precisely limit myself by the language of my claim.

The use and operation of my invention are as follows:

The coil $B^4$, being in circuit with commercially supplied alternating current, the alternation of the current through the pole pieces $B^1$ and $C^5$ causes a rotation of the rotor $C^3$ and the shaft $C^8$ in step with the alternating current supply. This rotation of the rotor $C^3$ and shaft $C^8$ causes a rotation of the drum $D^6$. Rotation of the drum causes movement of the time indicating symbol $D^{15}$ in line with the aperture $A^8$ and past the indicating fingers $A^9$. The alternating current motor may be launched, for example, by manual rotation of the knob $C^{10}$, and if launched at a speed approximately that or somewhat greater than synchronous, it will continue rotation indefinitely unless and until the circuit through the coil $B^4$ is interrupted or broken. In order to set the drum, for example to compensate a stoppage of the clock, the operator rotates a knob $D^{14}$ which effects a rather rapid rotation of the drum and permits it to be readily set. The inertia member above described aids in the manual launching of the clock and prevents hunting during operation.

In the forms herein shown, the member $E^6$ tends magnetically to hold a predetermined and normally fixed relationship to the member $E^3$. A sudden change in the velocity of the rotation of the shaft $E^8$ tends to move the member $E^3$ in relation to the magnetic inertia member $E^6$. The magnetic drag thereupon operates to pull the two members back into their predetermined normal relationship, and the result is a resistance to changes of rotation of the rotor as a whole and a prevention of the so-called hunting of the rotor.

I find the form shown in Figure 8 and following to be a particularly efficient embodiment of my invention, the magnetic drag between the teeth of the stars $I^1$ $I^2$ and the teeth of the member H being efficient normally to tend to maintain the two members normally in their fixed relationship. The device is effective both to prevent hunting and to assist in ready starting of the device when launched at a speed somewhat greater than synchronism. This structure may be referred to as a loose coupling although it is not at all to be considered as the sort of device described as loose couplings in mechanical structures. This type of coupling is a loose coupling electro-magnetically. Its primary function is to permit of automatic or self-adjustment in an electric drive which is necessary to compensate for slight irregularities either in the electric impulses or in mechanical system which will tend to throw a synchronous drive out of step or out of synchronism.

I claim:

In a synchronous electric motor, an alternating magnetic field circuit, a rotor adapted to be influenced by the field, means outside the field and rotor for opposing changes in angular velocity of said rotor, said means including members adapted to act upon each other magnetically and adapted to oppose relative motion with relation to each other largely by magnetic force, one of said members being rigidly connected to the rotor.

WALTER A. SPEAR.